United States Patent [19]
Sakamoto et al.

[11] 3,988,827
[45] Nov. 2, 1976

[54] SMALL-SIZE CUTTER

[75] Inventors: Kaneaki Sakamoto, Chigasaki; Ichiro Tokunaga, Yokohama, both of Japan

[73] Assignee: Kabushiki Kaisha Ogura Chuck Seisakusho, Japan

[22] Filed: June 16, 1975

[21] Appl. No.: 587,219

[30] Foreign Application Priority Data
June 21, 1974 Japan............................ 49-72894[U]

[52] U.S. Cl.................................... 30/92; 30/241
[51] Int. Cl.²................... B26B 15/00; B23D 27/04
[58] Field of Search........................ 30/228, 241, 92

[56] References Cited
UNITED STATES PATENTS

| | | | |
|---|---|---|---|
| 2,376,590 | 5/1945 | Forss | 30/241 |
| 3,022,576 | 2/1962 | Daman | 30/241 |

Primary Examiner—Al Lawrence Smith
Assistant Examiner—J. C. Peters
Attorney, Agent, or Firm—Carroll F. Palmer

[57] ABSTRACT

A small size, portable cutter of steel or other metallic rods or wires including a slide arm having a blade mounted at an outer end, a lever connected with an inner end of the slide arm, and an eccentric cam member rotated from a motor and having a whole cam circumference inscribed with an end section of the lever to form a great contact area for transmitting the driving force to the slide arm which thereby protrudes outwardly the blade to cut a metallic rod or wire in cooperation with a stationary blade fixedly mounted on the body frame.

1 Claim, 2 Drawing Figures

SMALL-SIZE CUTTER

BACKGROUND OF THE INVENTION

This invention relates to a cutter of steel or other metallic rods or wires and particularly to a compact, portable cutter including a cam actuating mechanism driven by a motor.

The majority of cam actuated cutters on the market is a large scale type which can not be transferred without any transfer aids for the permanent installation on the ground, and an only small number of the steel rod cutters are known as a compact, portable type which is easy for a user himself to transfer onto the spot. One of the reasons why such a heavy large scale cutter is prevailing in the market is that the compact, portable type of cutter can only treat limited diameters of the steel rod, or has a poor durability when it is used to cut a large diameter steel rod. The cutter arrangement of this type, generally, includes a slide arm having a cutting blade at one end and a cam member driven from a suitable power source to actuate the slide arm in contact therewith by the intermediary of a roller. Since the cam member and the roller are arranged to form therebetween a contact point in an outer circumference of the two members, the roller and the cam member are likely to be deformed or split due to a much excessive load so that the prior art compact, portable cutter is unsuited to cutting a large diameter of steel rods or wires.

SUMMARY OF THE INVENTION

Accordingly, an object of this invention is to provide a compact, portable cutter capable of treating a relatively large diameter of steel or other metallic rods or wires.

Another object of this invention is to provide a compact, portable cutter having a satisfactory durability against a much excessive load exerted upon cutting a relatively large diameter of steel or other metallic rods or wires.

According to this invention, a compact, portable cutter has a cam means arranged in contact with an inscribed contor surface of a slide arm to form a large contact area for transmitting the operative force so that a larger diameter steel rod or wire may be thereby effectively cut apart.

Any other objects and the features of this invention will be understood in the following description of one preferred embodiment of this invention made with reference to the accompanying drawings.

DETAILED DESCRIPTION OF THE PREFERRED EMBODIMENT

Figure 1:
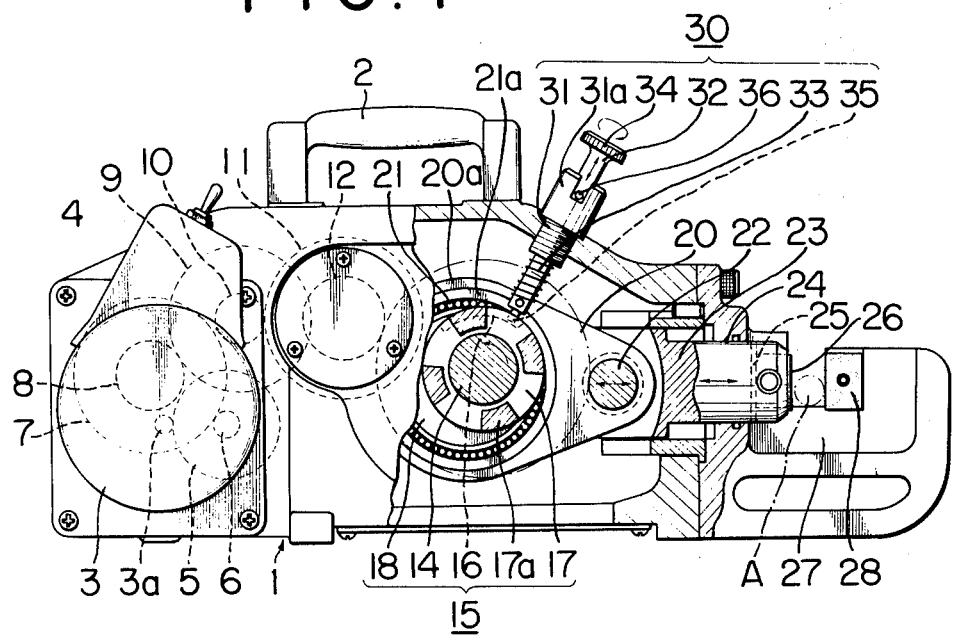
FIG. 1 is a front view of one preferred embodiment of this invention, partially taken away for the convenience of the description.
Figure 2:
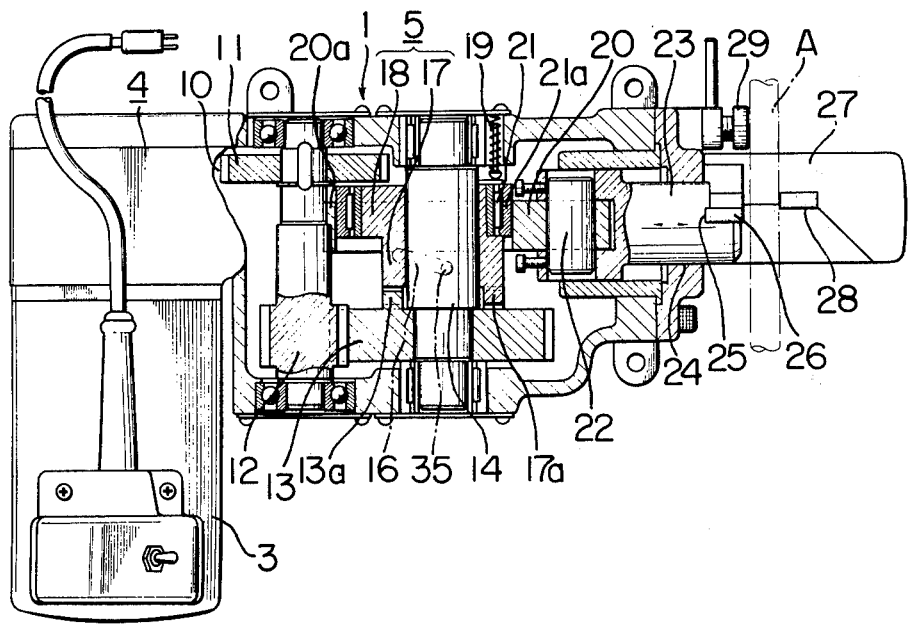
FIG. 2 is a plane view of the embodiment also partially taken away for the convenience of the description.

Referring to the drawings, the cutter of this invention has a generally rectangular body frame 1 provided in an outer surface with a handle 2, and a small-size electric motor 3 mounted thereon at the left end as viewed in the drawings. A reduction gear mechanism generally designated at 4 is connected with a motor shaft wheel 3a and as clearly shown in FIG. 1 comprises a series of wheels 5 through 13 each journaled on a generally left half of the body frame 1, as viewed in FIG. 1. The last output wheel 13 of the reduction gear mechanism 4 is mounted on a cam axis 14 to rotate freely of the latter.

On the cam axis is disposed a cam member 15 to rotate around the axis, but freely move in the thrust direction thereof. The cam member comprises a cylindrical section 17 having in the circumferential portion a thrust guide groove 16 below described and a large diameter cam disc 18 formed eccentrically of the cylindrical section. The cylindrical section 17 has clutch teeth 17a to be brought in a meshing engagement with clutch teeth 13a formed on the last output wheel 13 of the reduction gear mechanism. A spring device 19 is disposed between a portion of the body frame and the cam disc 18 whereby the cam member is normally urged in a direction to bring the clutch teeth 17a of the cylindrical section 17 into the meshing engagement with those of the output wheel 13 so that the cam member is operatively rotated by the force transmitted through the reduction gear mechanism.

A reciprocal rod 20, as clearly shown in FIG. 1, has a great annular section 20a formed at one end to closingly encircle a needle bearing case 21a which houses bearing needles 21 and is disposed around the cam disc 18. The reciprocal rod is connected at the other end through a shaft 22 with one end of a slide arm 23 which is freely extending through an aperture 24 of the body frame thereby to be guided for a horizontal reciprocal movement. The slide arm presents at the distal end a groove 25 in which an actuated blade 26 is fixedly mounted. A stationary blade 28 is securely carried in an opposite position to the actuated blade 26 on a steel rod receiving arm 27 extending from the body frame. A bolt 29 may be disposed on a portion of the body frame to hold in cooperation with the blade 28 a steel rod to be cut against the displacement caused by an impact exerted on the rod when it is cut.

A cam lock mechanism generally designated at 30 in FIG. 1 is provided on a portion of the body frame 1 to hold the cam member out of the meshing engagement of the teeth 17a with 13a against the biasing force of the spring 19. The lock mechanism 30 comprises a hollow cylindrical sheath 31 securely mounted on the body frame 1 and having a notched portion 31a, an actuating rod 32 having an outer knob portion 34 and thence extending through the sheath 31 to terminate in a protrusion 35 which is capable of engaging into and out of the thrust groove 16 of the cam member 15, and a coil spring 33 disposed on the actuating rod to urge the latter in engagement with the thrust groove at the protrusion 35. The actuating rod carries a pin 36 disposed to become engaged in the notched portion 31a of the sheath thereby to keep the actuating rod and accordingly the protrusion 35 away from the groove 16 of the cam member, when the actuating rod is manually pulled out and turned at a suitable angle.

In operation, as the small size cutter has been placed on the place with or without fixing means, such as bolt and nut, etc., a material A to be cut, such as a steel rod, is set firmly on the receiving arm by means of the bolt 29, and the actuating rod is manipulated to bring the protrusion 35 into engagement with the thrust groove of the cam member whereby the latter is held against the action of the spring 19 in a position that the clutch teeth 17a is apart from the teeth 13a of the output wheel of the reduction gear mechanism. Then the motor is powered to drive the reduction gear mechanism the output wheel 13 of which is thus rotated. When the actuating rod of the cam lock mechanism is then manually pulled out to relieve the inner protrusion thereof from the thrust groove, the cam member 15 is displaced along the axis by action of the spring 19 to establish the meshing engagement between the clutch teeth 13a and 17a, and the rotary force of the output wheel is transmitted to the cam member. The rotary force of the cam disc of the latter exerts a pressing force on the great annular section of the reciprocal rod efficiently because of the large contact area formed between the inscribed contor surface of the annular section of the rod and the periphery of the cam disc which is intermediated by the needle bearing. The rod is thus displaced by action of the pressing force to extrude through the shaft 22 the slide arm in a horizontal direction outwardly toward the extreme left side as viewed in the drawings and the actuated blade progresses toward the stationary blade thereby to cut apart material A in cooperation with the latter blade.

If upon the cutting operation the actuated blade is subjected to a much excessive load, the reciprocal rod pressing through the slide arm the actuated blade may transmit a great force sufficiently to overcome such a much excessive load because its closed, inscribed contor surface forming a great contact area with the cam disc.

When material A has been cut and the cam member rotates by more than 180°, the reciprocal rod is restored in accompany with the slide arm and the actuated blade. As the cam member 15 approaches a 360° rotation, the thrust groove 16 of the cam member is brought into an alignment with the protrusion 35 of the cam lock mechanism and then receives the protrusion urged by the spring 33. The cam member may be thereby displaced back against the force of the spring 19 gradually away from the output wheel while being rotated till 360° when the clutch teeth 17a is disengaged from the teeth 13a of the output wheel to stop the further rotation of the cam member. Another cycle of the cutting operation may be started by manually pulling out the knob of the cam lock mechanism and repeated in a same manner as above described.

If material A should be continuously cut apart while being manually shifted on the receiving arm of the cutter, as often desired in case of material A being rather longer, it is desired that the cam member continue its rotation over any desired number of the cutting cycles. This may be achieved by pulling out and then turning the actuating rod to bring the pin 36 into engagement with an outer edge of the sheath and keep the actuating rod in a position that the protursion 23 is disengaged from the thrust groove 16 of the cam member. To the extent that the actuating rod is held in such a position, the cam member is urged by action of the spring 19 to be kept in a position allowing the clutch teeth to be engaged with the output wheel of the reduction gear mechanism.

We claim:

1. A portable, small size cutter for cutting steel rods or wires comprising a body frame, an electric motor disposed in said body frame, a reduction gear mechanism driven by said electric motor, an axial shaft journaled at its opposed ends in said body frame and having an eccentric circular cam means rotated thereon by said gear mechanism, a needle bearing disposed around the whole periphery of said eccentric circular cam means, a rod having a section formed at one end to enclose the whole circumference of said cam means by the intermediary of said needle bearing, a horizontally reciprocal slide arm having at an inner end a shaft coupling it with another end of said rod and extending outwardly through said body frame, a first blade mounted on an outer end of said slide arm, and a material rod receiving member protruding outwardly through said body frame having a stationary blade mounted in a position opposed to said first blade whereby material may be cut apart between said stationary blade and the first blade capable of moving toward and away from said stationary blade, said eccentric circular cam means being movable on said axis shaft in the thrust direction into and out of meshing engagement with said reduction gear mechanism, and being provided with means for controlling said thrust movement whereby the cutting operation is selected between a mode in which the reciprocation of said movable blade is discontinued after said eccentric means has made a 360° rotation without disenergizing said electric motor and another mode in which said eccentric means continues a plurality of 360° rotations thereby to repeat the reciprocation of said movable blade.

* * * * *